Figure 1:
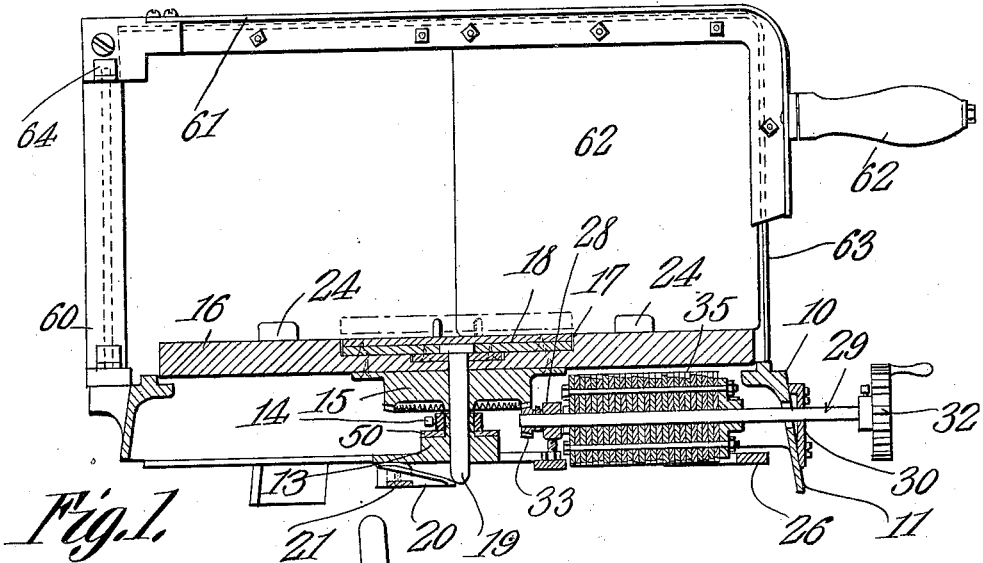

M. HUGGINS & E. L. GRAHAM.
CHEESE CUTTER.
APPLICATION FILED AUG. 21, 1908.

917,073.

Patented Apr. 6, 1909.
3 SHEETS—SHEET 1.

Witnesses

Inventors
Mark Huggins and
E. L. Graham
By C. A. Snow & Co.
Attorneys

M. HUGGINS & E. L. GRAHAM.
CHEESE CUTTER.
APPLICATION FILED AUG. 21, 1908.
917,073.
Patented Apr. 6, 1909.
3 SHEETS—SHEET 2.
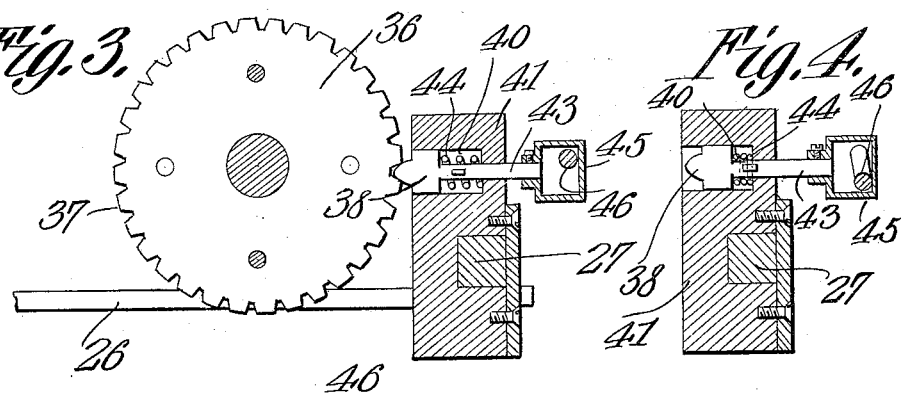
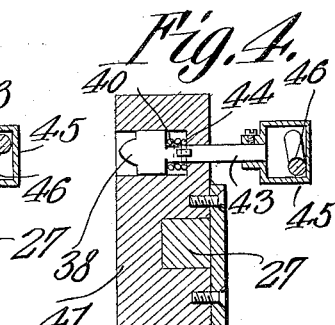
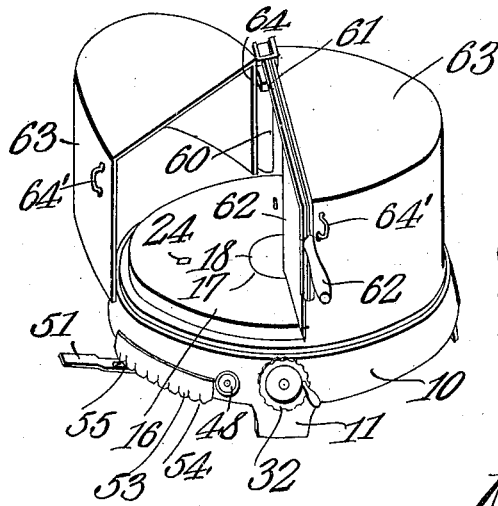
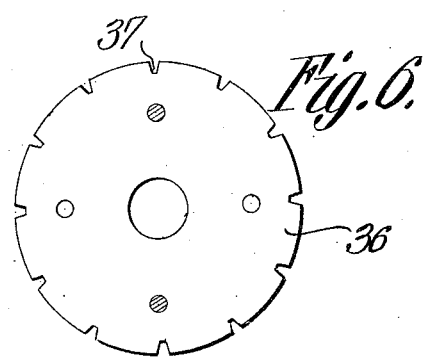
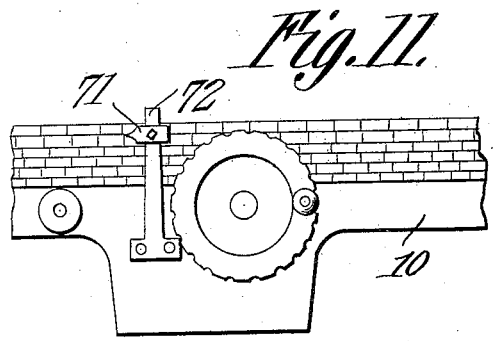
Witnesses
Mark Huggins and
Er L. Graham
Inventors
By C. A. Snow & Co.
Attorneys M. HUGGINS & E. L. GRAHAM.
CHEESE CUTTER.
APPLICATION FILED AUG. 21, 1908.
917,073.
Patented Apr. 6, 1909.
3 SHEETS—SHEET 3.
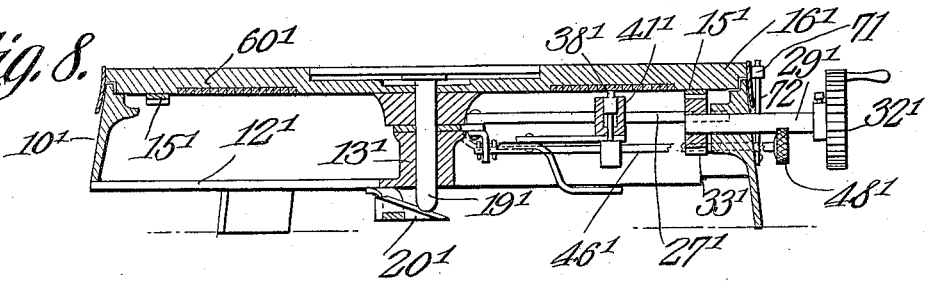
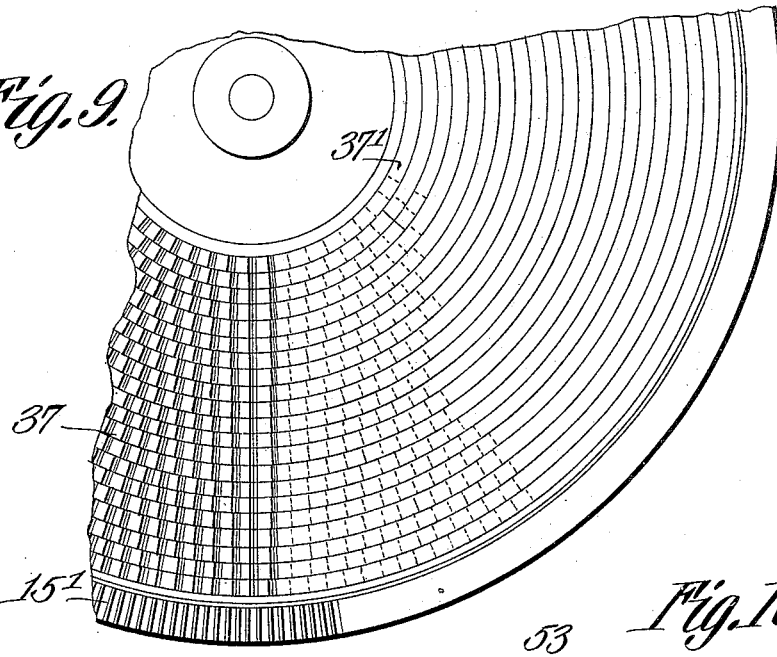
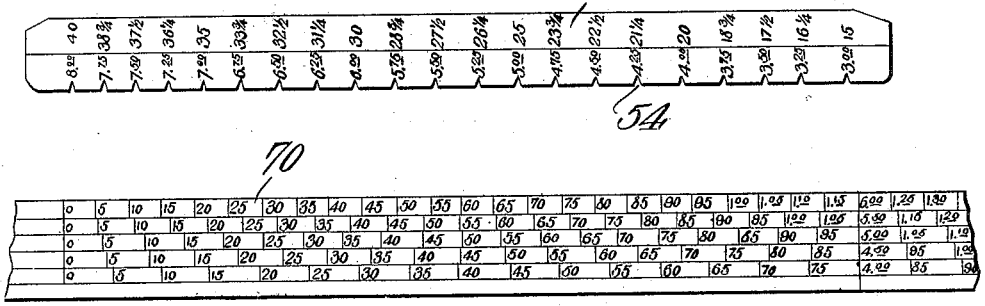
Witnesses
Mark Huggins AND Er L. Graham Inventors
By C. A. Snow & Co.
Attorneys

UNITED STATES PATENT OFFICE.

MARK HUGGINS AND ER L. GRAHAM, OF COLUMBUS, OHIO.

CHEESE-CUTTER.

No. 917,073.  Specification of Letters Patent.  Patented April 6, 1909.

Application filed August 21, 1908. Serial No. 449,663.

*To all whom it may concern:*

Be it known that we, MARK HUGGINS and ER L. GRAHAM, citizens of the United States, residing at Columbus, in the county of Franklin, State of Ohio, have invented a new and useful Cheese-Cutter, of which the following is a specification.

This invention relates to cheese cutters, and has for its principal object to provide a machine by which a cheese or other article may be divided into aliquot parts each of a predetermined weight or of a predetermined value, a cheese of any weight or value being placed on the machine and the mechanism being then adjusted so as to divide the cheese into equal parts each of the same weight or the same value.

A further object of the invention is to provide a dividing device which includes a tactile or audible signaling means of such nature that the operator will be informed as to the exact extent of rotated movement of the cutter board, and hence the quantity of cheese moved beyond the knife to be cut off.

A still further object of the invention is to provide an apparatus that may be readily and quickly adjusted for the purpose of securing any desired subdivisions of a cheese of any value.

A still further object of the invention is to provide in a device of this type for the ready shifting of the position of the cutter board for the purpose of alternately cutting from the exposed faces of the cheese so that one face will not be allowed to dry out to such an extent as to impair its value.

A still further object of the invention is to provide a scale which will indicate the extent of movement of the cutter board when the same is rapidly adjusted for the purpose of cutting off a section of greater weight or value than one of the aliquot parts for which the primary dividing mechanism is adjusted.

A still further object of the invention is to provide an improved means for centering the cheese on the cutter board.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

Figure 2:
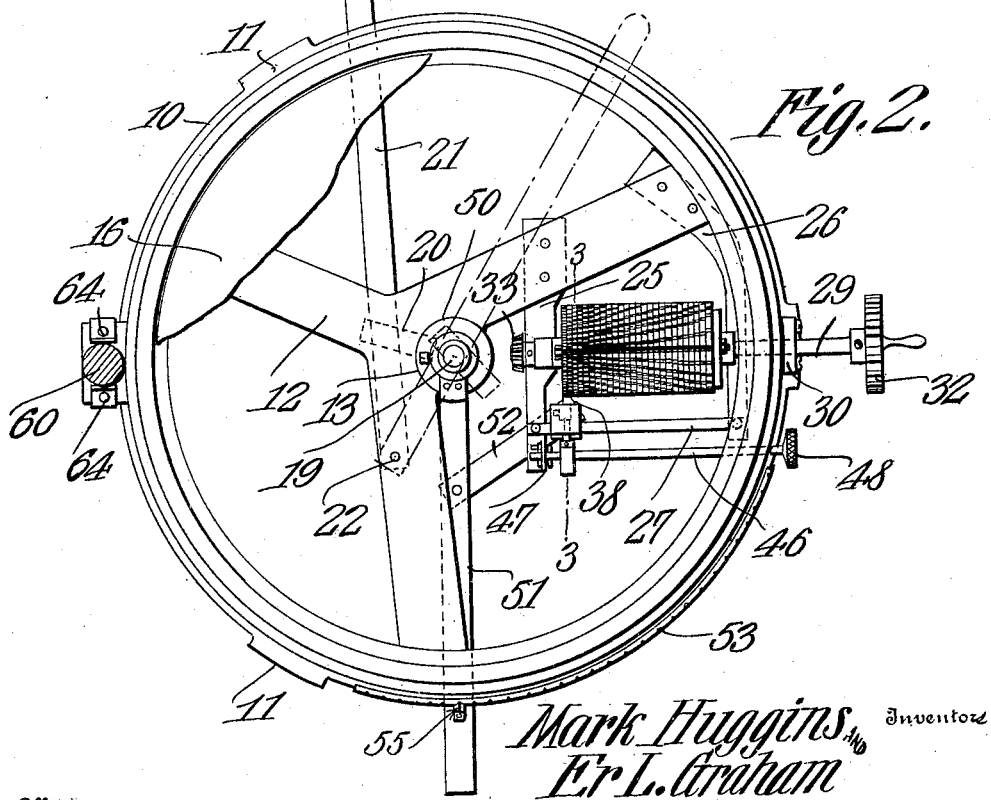

In the accompanying drawings:—Figure 1 is a sectional elevation of a cheese cutter constructed in accordance with the invention. Fig. 2 is a plan view of the same, the greater part of the cutter board being broken away in order to show the dividing mechanism. Fig. 3 is a transverse sectional view on the line 3—3 of Fig. 2, the view being on an enlarged scale and showing the signaling and retaining pawl in engagement with one of the dividing disks. Fig. 4 is a similar view of a portion of the same showing the pawl moved to idle position. Fig. 5 is a detail view of a portion of the crank shaft by which the pawl is adjusted. Fig. 6 is an elevation showing a dividing disk having a less number of indentations than the one shown in Fig. 3. Fig. 7 is a perspective view of the cheese cutter as a whole showing the cover partly open. Fig. 8 is a transverse sectional view of a cutter board and dividing mechanism of modified construction. Fig. 9 is an inverted plan view of the portion of the cutter board shown in Fig. 8, the view being on an enlarged scale. Fig. 10 is a view of a notched indicating plate holding the adjusting lever. Fig. 11 is an elevation of the indicating table used for the measurement of cutter board movements of greater degree than usual. Fig. 12 is a view of the indicating table on an enlarged scale.

Similar numerals of reference are employed to indicate corresponding parts throughout the several figures of the drawings.

The main frame of the device is in the form of a ring 10 having integral supporting feet 11 and provided with a spider 12 having a central hub 13 having a reduced upper end 14 on the top of which rests the hub of a crown bevel gear 15, the latter being secured to the under side of the revoluble cutter board 16. The central portion of the cutter board is provided with a circular recess 17 for the reception of the disk 18 that is carried by the upper end of a spindle 19, the latter extending downward through central openings formed in the cutter board, the gear 15 and the hub 13 and forming the pivot around which the cutter board turns. The lower end of the spindle is rounded and is arranged to be engaged by a wedge-shaped cam block 20 that is carried by a lever 21 fulcrumed at 22 on the spider and having its handle end projecting out beyond the base of the machine.

When a cheese is to be placed on the cutter board the lever is swung from the full line to the dotted line position in Fig. 2 and this will force the cam block 20 under the foot of the spindle 19 and will raise the disk 18 to the position shown by dotted lines in Fig. 1, the upper face of the disk being in horizontal plane above the top of the small impaling plates 24 that are carried by the cutter board, and embed themselves in the cheese to prevent turning of the latter. The cheese is placed on the top of the elevated disk 18 and the cheese is then turned together with the disk and shifted until the operator is satisfied that it is in approximately central position over the cutter board. The lever 21 is then swung back to the full line position shown in Fig. 2 so that the wedge block is moved from under the foot of the spindle and the disk descends under the weight of the cheese so that the small retaining plates 24 can embed themselves in the cheese and thus prevent independent movement of the latter during the cutting operation.

Secured to the spider are two arms 25 and 26, the free ends of which are connected together by a rectangular bar 27. The innermost arm 25 carries a vertically adjustable bearing 28 for the reception of the inner end of a shaft 29, the outer end of said shaft being mounted in a bearing opening formed in a small plate 30 secured to the front portion of the base ring 10. The extreme outer end of the shaft is provided with a hand wheel 32 which for convenience may have a milled or toothed periphery, and the inner end of the shaft carries a small bevel pinion 33 that intermeshes with the bevel wheel 15. In the present instance the bevel wheel 15 has sixty teeth and the pinion has twelve teeth so that five complete revolutions of the pinion are necessary for one complete revolution of the bevel wheel 15 and the cutter board. This proportion may be varied to any extent, and in the present instance is only given as an example in order that the dividing of the cheese into aliquot parts may be better understood.

Secured to the shaft 29 is a dividing cylinder 35 which in the present instance is made up of a series of disks 36 each provided with indentures 37 which may be engaged by a pawl 38. The disks are provided with different numbers of indentures respectively, the outermost disk shown in Fig. 6 being in the present instance provided with twelve of such indentures corresponding to the number of teeth in the bevel pinion 33, so that a movement of the shaft sufficient to force one of such indentures beyond the pawl 38 will move the cutter board to the extent of one-twelfth of a revolution of the shaft, that is to say, one tooth of the bevel pinion, or one-sixtieth of a revolution of the cutter board, and if the cheese carried by the cutter board is of fifteen pounds weight and worth twenty cents per pound its entire value will be three dollars, and a movement of the shaft sufficient to click the pawl from one indenture to the next of the disk shown in Fig. 6 will mean that the cutter board has moved to an extent sufficient to pass five cents' worth, or one-quarter of a pound of the cheese beyond the cutting knife. If half a pound, or ten cents' worth is required the cheese is turned until the pawl has clicked into the second indenture, and the operator is thus informed both by the noise and by the "feel" of the handle that the cutter board has been moved to the proper extent.

The pawl 38 may, of course, be adjusted in order to present it into operative relation to any one of the disks, and for this purpose said pawl is guided in a recess 40 formed in a block 41 that is slidably mounted on the bar 27. The shank 43 of the pawl is surrounded by a compression spring 44 that urges the pawl outward into engagement with the disks. At the rear end of the shank 43 is secured a yoke 45 which encircles a crank shaft 46. This crank shaft has one end mounted in a bracket 47 carried by the arm 25 and its opposite end extends through a guiding opening formed in the base ring 10 while the extreme outer end of the arm is provided with an operating knob 48. By turning this knob the shaft may be rotated and the pawl withdrawn to the position shown in Fig. 4 so as to be clear of the dividing cylinder, after which the block 41 may be moved in the direction of the length of the bar 27 for the purpose of adjusting the pawl 38 opposite any one of the disks 36.

On the reduced portion 14 of the spider 13 is mounted a ring 50 to which is secured the inner end of a lever 51, said lever being connected by a link 52 to the lower face of the block 41 and by swinging the lever on its pivot the block may be shifted in the direction of the length of the bar for the purpose of bringing the pawl 38 opposite any one of the disks. In order to stop the pawl in a position opposite any desired disk a scale bar 53 is secured to the base ring and said scale bar is provided with indentations 54 which are arranged to be engaged by a tooth 55 on the lever 51. Opposite these indentations are placed marks indicating the weights and value of the cheese and these will be seen on reference to Fig. 10. In the present instance the mechanism is arranged for the cutting of cheeses varying from fifteen to forty pounds in weight and from three dollars to eight dollars in value. When a cheese weighing fifteen pounds and valued at three dollars is to be divided the lever is moved opposite the indentation bearing that mark, and as a consequence the pawl will be moved opposite the disk shown in Fig. 6, which disk contains twelve notches as previously described, so that movement of a single notch past the pawl will effect a rotative movement of the cutter board to the extent of six degrees or one-sixtieth of a revolution, thereby moving one-quarter of a pound of cheese, or five cents' worth, past the cutting knife. When a cheese valued at eight dollars and weighing forty pounds is to be cut the lever is moved opposite the proper indentation and the pawl will then be moved into operative engagement with the disk shown in Fig. 3. This disk contains thirty-two indentations. As five complete revolutions of the shaft, being five complete revolutions of the bevel pinion, are necessary to one complete revolution of the cutter board, it follows that the movement of the disk shown in Fig. 3 to the extent of one indentation will be equal to one-thirty-second of one-fifth, or 1/160 of a revolution of the cutter board, and the cheese will thus be divided into one hundred and sixty equal parts, each weighing one-quarter of a pound, and each of a value of five cents. In similar manner the intermediate notches and intermediate disks are arranged for the division of the cheese into parts of equal size or weight, or value and where the cheese is not valued at twenty cents per pound the lever may be shifted from one notch to the other to secure five cents' worth or to secure a quarter or half pound, or other part as may be desired. In all cases, however, the operator is informed by the audible and tactile signaling of the entrance of the pawl into the indentations of the dividing disks and may turn the cutter board to secure a presentation of any desired quantity of cheese in cutting position.

The cutting knife is pivoted on a post 60 that is secured to a suitable lug projecting from the base ring. The knife proper is carried by a frame comprising a pair of angle bars 61, the blade 62 being secured between the bars by suitable bolts. At the front of the frame is an operating handle 62 of any ordinary construction. The cutting blade is so arranged as to cut with both its vertical and horizontal edges and may be arranged to move inward from the front toward the center of the cheese, or may move rearward from the back toward the center of the cheese, the particular mounting of the knife being unimportant so far as the present invention is concerned.

With a knife and frame of the construction shown, a two-part cover or casing 63 may be employed, each member being semi-cylindrical in form and mounted on small pivots 64 carried by the knife standard. The upper and front edges of the cover are arranged to fit within the webs of the angle bar frame and each cover section is provided with a suitable handle 64' for convenience in moving it to open and closed position.

In Figs. 8 and 9 is illustrated a modification of the dividing means. In this case the cutter board 60' is provided with an annular rack 15' which is engaged by a pinion 33' mounted on an operating shaft 29'. In the lower face of the cutter board is secured a disk having in its lower face a plurality of concentric rows of indentations 37'. The number of rows of indentations is unimportant but the number of indentations in each row differs from that in the others. These indentations are arranged to be engaged by a pawl 38' that is mounted in a block 41' which may be adjusted in the direction of the length of a carrying bar 27', the pawl being under the control of a crank bar or shaft 46' having at its outer end an operating knob 48 so that the pawl may be moved from engagement with the indentations of any one of the rows to permit free movement of the block and the presentation of the pawl into operative relation with one of the other rows. As the pawl engages the indentations the operator is informed through the audible clicking of the pawl and the "feel" of the hand-wheel, that the cutter board is moving past the pawl and is thus informed as regards the extent of the movement. Where larger quantities are to be cut an auxiliary scale 70 may be placed around the edge of the cutter board. This scale is illustrated in detail in Fig. 12 and comprises a number of superposed rows of graduations each provided with marks indicating values. It will be seen that the space between zero and the space marked six dollars, which latter indicates a cheese of a value of six dollars, is divided into twenty-four parts, and opposite the divided graduations are marks 5, 10, 15, 20, etc., indicating values so that the cheese may be readily adjusted for the purpose of cutting off a piece of any required value. Opposite this scale is a pointer 71 which may be vertically adjusted on a small standard 72 carried by the base, the pointer being placed opposite that scale which indicates the value of cheese to be cut.

An advantage possessed by applicants' structure is that it is possible to turn the cutter board in either of two directions, and thus slices may be cut from a cheese at either side of an incision therein. By removing the cheese alternately from opposite sides of an incision referred to, it is possible to dispense the cheese without leaving a single surface exposed for such length of time as to render the adjacent portion of the cheese valueless.

What is claimed is:—

1. In a cheese cutter, a revoluble cutter board, means for revolving the same, and a tactile means for determining the extent of movement of the board irrespective of the direction in which it is revolved.

2. In a cheese cutter, a revoluble cutter board, and means for holding same after a partial revolution the holding means being arranged to give both a tactile and audible signal to indicate the extent of movement of the board irrespective of the direction in which the board is moved.

3. In combination, a revoluble cutter board, a member arranged to move with the cutter board and provided with a plurality of rows of indentations having opposite sides lying in planes at angles equal to each other the number of indentations in each row differing from those in the others, and a pawl arranged to engage the indentations and shiftable to a position opposite any one of the rows.

4. In a cheese cutter, a revoluble cutter board, a shaft, gearing connections between the shaft and cutter board, a dividing cylinder carried by the shaft and provided with peripheral rows of indentations each row having indentations of a number different from that in the other row, a pawl adapted to engage the indentations, and means for shifting the pawl to present the same into operative relation with any row of indentations.

5. In combination, a cutter board, a shaft, gearing connections between the shaft and board, a dividing cylinder revoluble with the shaft and comprising a plurality of disks each provided with indentations, the number of indentations in each disk differing from those in the remaining disks, a pawl arranged to engage said indentations, and means for shifting the pawl to a position in alinement with any one of the disks.

6. In combination, a revoluble cutter board, a shaft, gearing connections between the shaft and cutter board, a dividing cylinder revoluble with the shaft and provided with a plurality of rows of indentations, the number of indentations in each row differing from those in the others, a pawl arranged to engage the indentations, a carrying block for said pawl, a support on which the carrying block is adjustable, and means for moving the pawl to inoperative position.

7. In combination, a revoluble cutter board, a dividing cylinder revoluble with the board and made up of a series of disks each provided with indentations, the number of indentations in each disk differing from those in the others, a bar arranged in parallel relation with the axis of the cylinder, a block carried by said bar, a spring-pressed pawl mounted in the block and arranged to engage in indentations, and means for moving the pawl to inoperative position.

8. In combination, a revoluble cutter board, a dividing cylinder revoluble with the board and made up of a series of disks each provided with indentations, the number of indentations in each disk differing from those in the others, a guiding bar arranged parallel with the axis of the cylinder, a block slidable on the bar, an actuating lever for the block, a graduated plate for indicating the position of the lever, a pawl carried by the block, and means for moving said pawl to inoperative position.

9. In combination, a revoluble cutter board, a dividing cylinder revoluble with the board and provided with rows of indentations, a bar arranged parallel with the axis of the cylinder, a block mounted on the bar, a pawl carried by the block and arranged to engage the indentations, means for moving the pawl to inoperative position, a pivotally mounted lever, an indicating plate having notches for stopping the lever or indicating its position, and a link connecting said lever to the block.

10. In combination, a revoluble cutter board, a shaft, gearing connections between the shaft and board, a dividing cylinder made up of a series of disks each provided with peripheral indentations, said cylinder being mounted on the shaft, a bar parallel with the axis of the shaft, a block guided on the bar, a spring-actuated pawl supported by the block, a yoke carried by the shank of the pawl, a crank shaft engaging said yoke and serving to move the pawl to inoperative position, and means for adjusting the position of the block.

11. In combination, a base ring, a spider frame carried thereby and provided with a hub having a reduced portion, a cutter board, a bevel gear secured to the under side of the cutter board, the hub of the bevel gear resting on the reduced portion of the hub of the spider, a central pivot pin extending through the bevel gear and hub, a shaft, a pinion carried thereby and intermeshing with the gear, a dividing cylinder mounted on the shaft and made up of a series of disks provided with peripheral indentations, a bar arranged parallel to the axis of the shaft, a block mounted on said bar, a pawl carried by the block and arranged to engage the indentations, a lever pivoted on the reduced portion of the spider hub, a link connecting said lever to the block, and a notched plate arranged on the base ring and provided with graduations to indicate the position of the lever.

12. In a cheese cutter, a revoluble cutter board having impaling members, a central disk normally seated in a recess in the cutter board and adapted to receive the cheese, and means for raising and lowering said disk.

13. In a cheese cutter, a cutter board having impaling devices and provided with a central recess, a disk seated in the recess, a pivot pin carrying the disk, and a cam movable under the pin to raise and lower said disk.

14. In a cheese cutter, a revoluble cutter board having a central recess, a disk seated in the recess, a pin carrying the disk, a wedge-shaped cam block arranged to engage under the pin, and a carrying lever for said cam block.

15. In a cheese cutter, a base ring, a cutter board, a standard carried by the base ring, a knife frame pivoted to the standard, a knife carried by the frame, and a sectional cover pivoted to the standard and arranged to close against the knife frame.

16. In a cheese cutter, a base ring, a cutter board, a standard on the frame, a knife frame pivoted to the standard and comprising a pair of angle bars, a cutting blade secured between said bars, and a two-part cover hinged to the standard and arranged to fold within the webs of the angle bars.

In testimony that we claim the foregoing as our own, we have hereto affixed our signatures in the presence of two witnesses.

MARK HUGGINS.
ER L. GRAHAM.

Witnesses:
JOSEPH A. WEIS,
W. H. PONTIUS.